US010689114B2

(12) United States Patent
Huber et al.

(10) Patent No.: US 10,689,114 B2
(45) Date of Patent: Jun. 23, 2020

(54) AIRCRAFT CARGO HOLD MOUNTING DEVICE

(71) Applicant: TELAIR INTERNATIONAL GMBH, Miesbach (DE)

(72) Inventors: Thomas Huber, Schliersee (DE); Richard Holzner, Stephanskirchen (DE)

(73) Assignee: Telair International GmbH (DE)

(*) Notice: Subject to any disclaimer, the term of this patent is extended or adjusted under 35 U.S.C. 154(b) by 173 days.

(21) Appl. No.: 15/558,690

(22) PCT Filed: Mar. 21, 2016

(86) PCT No.: PCT/EP2016/056137
§ 371 (c)(1),
(2) Date: Sep. 15, 2017

(87) PCT Pub. No.: WO2016/150908
PCT Pub. Date: Sep. 29, 2016

(65) Prior Publication Data
US 2018/0111689 A1  Apr. 26, 2018

(30) Foreign Application Priority Data

Mar. 20, 2015 (DE) ........................ 10 2015 104 230

(51) Int. Cl.
B64D 9/00 (2006.01)
B64F 5/10 (2017.01)
B64C 1/20 (2006.01)

(52) U.S. Cl.
CPC ................ B64D 9/003 (2013.01); B64C 1/20 (2013.01); B64F 5/10 (2017.01); B64D 2009/006 (2013.01)

(58) Field of Classification Search
CPC ..... B64D 9/003; B64D 2009/006; B64F 5/10; B64C 1/20
See application file for complete search history.

(56) References Cited

U.S. PATENT DOCUMENTS 2,173,298 A    9/1939  Gravenstine
3,709,450 A *  1/1973  Watts ....................... B64D 9/00
                                                        410/79

(Continued)

FOREIGN PATENT DOCUMENTS

CA    2859329 A1    3/2015
DE    19633032     2/1997

(Continued)

OTHER PUBLICATIONS

WO2005077755EnglishTranslation.*

(Continued)

Primary Examiner — Assres H Woldemaryam
(74) Attorney, Agent, or Firm — Barnes & Thornburg LLP

(57) ABSTRACT

A mounting device for mounting functional devices within a cargo hold of an aircraft. The mounting device includes at least one surface unit and a plurality of functional devices which can be mounted on the surface unit in such a way that the surface unit can be inserted together with functional devices mounted thereon into the aircraft cargo hold in the manner of a template in such a way that all the functional devices come to lie in defined mounting locations in the cargo hold and can be mounted on supporting structures of the aircraft or the cargo hold without adjustment in relation to the surface unit.

18 Claims, 6 Drawing Sheets

(56) References Cited

U.S. PATENT DOCUMENTS

| | | | |
|---|---|---|---|
| 4,000,870 A | | 1/1977 | Davies |
| 4,050,655 A | * | 9/1977 | Bogue ....................... B64C 1/20 244/137.1 |
| 4,696,583 A | | 11/1987 | Gorges |
| 5,464,086 A | | 11/1995 | Coelln |
| 5,890,582 A | | 4/1999 | McKinnon |
| 6,125,984 A | | 10/2000 | Huber |
| 6,926,481 B2 | * | 8/2005 | Huber ....................... B64C 1/20 410/77 |
| 8,226,034 B2 | | 7/2012 | Huber et al. |
| 8,851,488 B2 | | 10/2014 | Carruyo |
| 9,238,551 B2 | | 1/2016 | Kalitta |
| 9,963,232 B2 | | 5/2018 | Rajeev |
| 10,059,523 B1 | | 8/2018 | Chitragar |
| 2003/0156914 A1 | | 8/2003 | Huber |
| 2004/0218989 A1 | | 11/2004 | Huber |
| 2005/0224645 A1 | | 10/2005 | Huber |
| 2006/0065786 A1 | | 3/2006 | Huber |
| 2006/0137294 A1 | | 6/2006 | Waits, Jr. |
| 2006/0231681 A1 | * | 10/2006 | Huber ..................... B64C 1/061 244/119 |
| 2010/0230230 A1 | | 9/2010 | Huber |
| 2010/0230537 A1 | | 9/2010 | Huber |
| 2011/0095572 A1 | | 4/2011 | Wary |
| 2012/0061511 A1 | | 3/2012 | Huber |
| 2012/0304579 A1 | | 12/2012 | Dezoete |
| 2012/0312926 A1 | | 12/2012 | Holzner |
| 2013/0297065 A1 | | 11/2013 | Huber |
| 2013/0313073 A1 | | 11/2013 | Huber |
| 2013/0340364 A1 | | 12/2013 | Haselmeier |
| 2013/0340601 A1 | | 12/2013 | Townsend et al. |
| 2016/0244186 A1 | | 8/2016 | Brown |

FOREIGN PATENT DOCUMENTS

| | | | | |
|---|---|---|---|---|
| DE | 19633032 A1 | * | 2/1997 | ......... B60N 2/01525 |
| DE | 19720224 | | 10/1998 | |
| DE | 19812014 | | 8/1999 | |
| DE | 102004006648 | | 9/2005 | |
| DE | 102004044653 | | 4/2006 | |
| DE | 602005001782 | | 4/2008 | |
| DE | 102009012426 | | 9/2010 | |
| DE | 102012005353 | | 9/2013 | |
| DE | 102012008853 | | 10/2013 | |
| DE | 102013207645 | | 10/2014 | |
| EP | 0864489 | | 9/1998 | |
| EP | 0912394 | | 5/1999 | |
| EP | 1564141 | | 8/2005 | |
| EP | 1646556 | | 4/2006 | |
| EP | 1646558 | | 4/2006 | |
| EP | 2679485 | | 1/2014 | |
| GB | 2417619 | | 3/2006 | |
| WO | 2005/077755 | | 8/2005 | |
| WO | WO-2005077755 A1 | * | 8/2005 | ............... B64C 1/20 |
| WO | 2013/135855 | | 9/2013 | |
| WO | WO-2013135855 A1 | * | 9/2013 | ............... B64C 1/18 |

OTHER PUBLICATIONS

DE19633032A1EnglishTranslation.*
English Translation of International Preliminary Report on Patentability, PCT/EP2016/056137, dated Sep. 26, 2017.
Search Report and Written Opinion issued in App. No. PCT/EP2016/056137 (dated 2016).

* cited by examiner

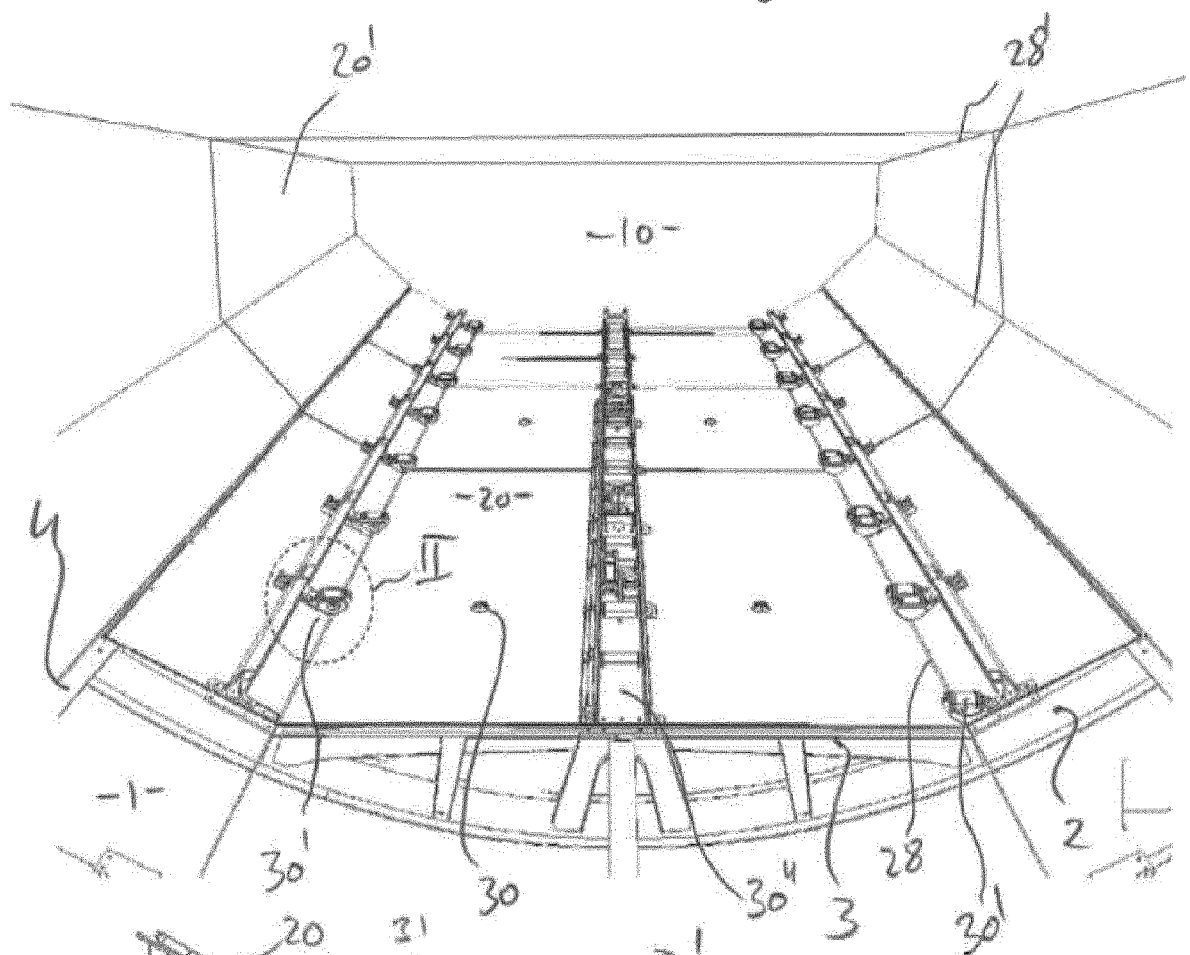
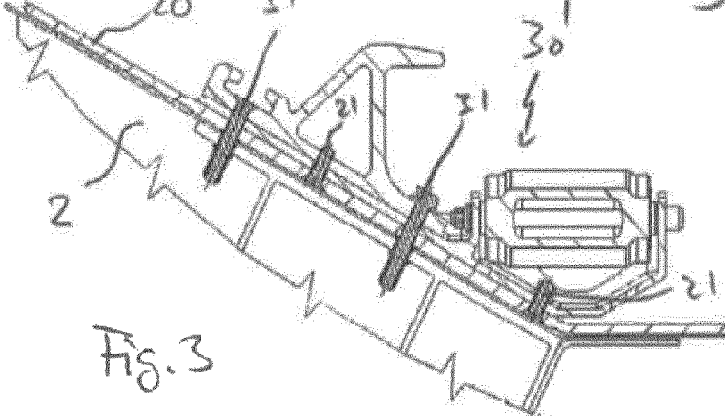
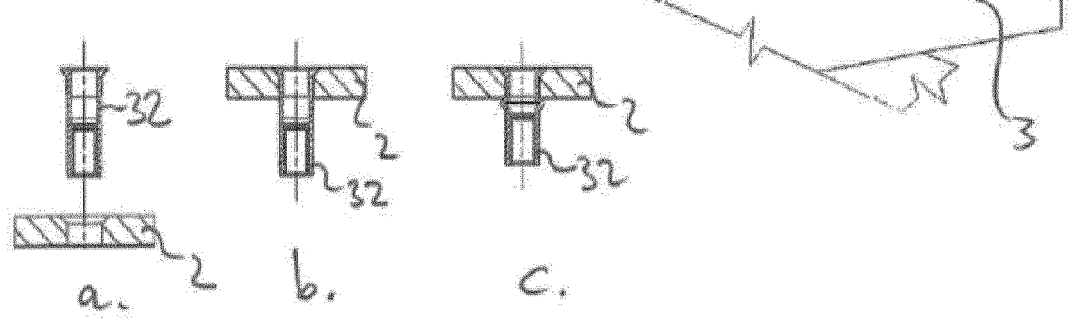

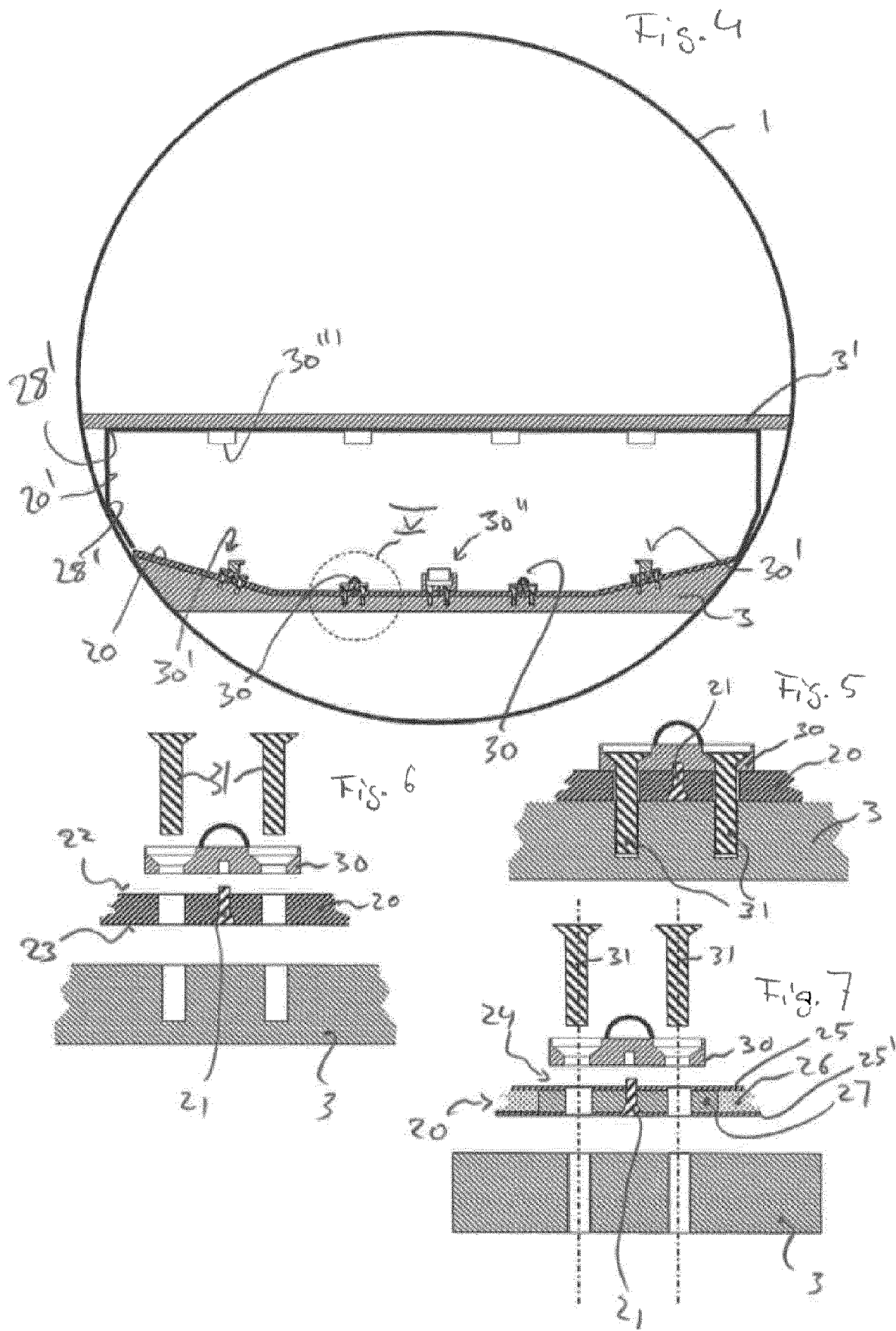

AIRCRAFT CARGO HOLD MOUNTING DEVICE

BACKGROUND OF THE INVENTION DESCRIPTION

Cross Reference to Related Applications

This application is a U.S. nationalization under 35 U.S.C. § 371 of International Application No. PCT/EP2016/056,137, filed Mar. 21, 2016, which claims priority to German Patent Application No. 102015104230.4, filed Mar. 20, 2015. The disclosures set forth in the referenced applications are incorporated herein by reference in their entireties.

The invention relates to a mounting device which serves to mount functional devices and similar essential elements within a cargo hold of an aircraft.

In the cargo hold of an aircraft, a plurality of functional devices is mounted, e.g. roller conveyors on which containers (ULDs), pallets or the like are moved in the freight compartment, bars for holding the freight items or lashing devices, for lashing freight items. All of these devices must be connected to stable supporting structures of the aircraft, i.e. to crossbeams connected to frames of the aircraft or to the frames themselves. Mounting on longitudinal beams is also necessary from time to time.

Furthermore, operators must be able to enter the cargo hold. Corresponding surface units must be provided for this purpose.

The assembly of the various functional devices as well as that of the surface units is complex.

BRIEF SUMMARY OF THE INVENTION

It is known from EP 1 646 558 B1 to mount complete ground modules including the functional devices and the supporting structures outside the aircraft and then to install them in the aircraft. This is, of course, not possible if an aircraft fuselage is already provided with the supporting structures.

It is the object of the invention to provide a mounting device with the aid of which assembly of functional devices and also surface units within an aircraft cargo hold is simplified. An exchange of functional devices and replacement with other functional devices should also be facilitated.

This object is achieved by a mounting device according to claim 1 and a method according to claim 11.

In particular, this object is achieved by a mounting device of a cargo hold of an aircraft which comprises at least one surface unit and a plurality of functional devices which can be mounted on the surface unit in such a way that the surface unit can be inserted together with the functional devices mounted thereon into the aircraft cargo hold in the manner of a template in such a way that all the functional devices come to lie in defined mounting positions in the cargo hold and can be mounted on supporting structures of the aircraft or the cargo hold without adjustment in relation to the surface unit.

It is an essential idea of the invention that not every functional device and also not every surface unit must be mounted separately within the cargo hold. Rather, the functional devices, which are to be mounted in the region of a surface unit, can be pre-mounted on the surface unit outside the aircraft and then move the entire surface unit into the aircraft and connect the functional devices there to the supporting structures at the locations provided for this purpose.

The functional devices can be attached to the surface units by gluing. However, in most cases, it is simpler and leads to more accurate results if the functional devices are designed such that they can be fastened to the surface units by screw devices. In this case, the screw devices can be actuated on a side of the surface unit which is opposite the functional device, i.e. with a slot, an inner hexagon, etc. This offers the advantage that the threads for the fastening screws can be arranged in the functional devices, i.e. the surface units need not have threaded bushes or the like.

The surface units are preferably designed to form a gas-tight and/or watertight barrier between their upper side and their underside. This prevents liquids from penetrating into the space below the surface units. Furthermore, the rooms above and below the surface units can be filled with halon for suffocating fires.

The surface unit may comprise sealing lips which are arranged at edges of the surface unit. These sealing lips can be used to seal the bilges of the aircraft in a gas-tight and/or watertight manner. Furthermore, they can provide a gas-tight and/or water-tight connection to adjacent components, e.g. wall panels and/or further surface units of further mounting devices. In one embodiment, the mounting device has a circumferential sealing lip.

Preferably, the surface units are designed to form an accessible floor. They are therefore used simultaneously for various purposes, on the one hand as a mounting aid for the functional devices, on the other hand as "floor elements" and—as described above—as gas and water barriers.

The surface units can be made for example from sheet metal for fire protection purposes. Preferably, the surface units are made of fibre-reinforced plastic material in sandwich construction, as is known per se. Such material is light, yet very stable.

In the sections where the functional units can be or are mounted, reinforcing devices are preferably provided in the material of the surface units. In particular, these reinforcements are against forces which act perpendicularly to the surface of the surface unit. Likewise, these are reinforcements against bending moments which are caused by stressing forces which act on the functional devices. Thus, if the surface units are constructed as sandwich components, which have high-stability surfaces between which a foam core is located, such components are very light. However, when high pressure forces occur, as during the mounting (or loading) of the functional devices, compression of the material can occur. This is countered by the fact that the above reinforcements are provided, e.g. the foam core is replaced by a solid material. Of course, it is also possible to change the structure of the area unit as a whole at the points of interest, e.g. to provide depressions (with increased surface stability).

The surface units can comprise a hybrid core with at least one, preferably synthetic resin-permeated, foam sheet, which is inserted between a first core layer of fibre-reinforced plastic and a second core layer of fibre-reinforced plastic. The surface unit may comprise one or more foam-free edge regions for the production of a materially bonded connection, which is planar in particular, between the core layers. Alternatively or additionally, the thickness of the foam sheet can decrease in a transition region to the edge region. The edge regions can preferably be used to connect the surface unit to the structure of the aircraft.

In one embodiment, the first and/or second core layer comprises glass fibres, in particular S-glass. The core layer, which is located in the built-in state at the bottom, preferably has at least one (narrow-mesh) multi-axial carbon fibre layer, which can serve as a fire barrier.

A possible structure (from top to bottom) could include the following layers:
- a first core layer with approx. 1-1.2 mm glass fibre-reinforced plastic, e.g. by means of S-glass;
- a foam core, preferably resin-impregnated;
- a second core layer with approx. 0.2-0.4 mm glass fibre-reinforced plastic (at the top, close to the core) and approx. 0.2-0.4 mm glass fibre-reinforced plastic, e.g. by means of S-glass (at the bottom, facing away from the core).

The glass fibre-reinforced plastic ensures increased resistance to impact.

A transitional region, which comprises both foam material and also fibre-reinforced plastic, in particular glass fibre-reinforced plastic, preferably by means of S-glass, preferably adjoins the foam-free edge region or the edge regions.

In one embodiment, the hybrid core can be designed in such a way that a (foam-free) edge region is formed on the entire circumference, to which a transition region adjoins in the direction of the hybrid core centre.

The thickness of the foam sheet decreases continuously and/or stepwise in the transition region in the direction of the (foam-free) edge region. In other words, the thickness of the foam sheet in the direction of the (foam-free) edge region is thus reduced in the direction of the outer edge of the hybrid core.

The thickness of a fibre-reinforced plastic and/or a number of layers of fibre layers in the/one transition region increase towards the edge region in one embodiment. For example, the thickness of the plastic or of the plastic layer per length unit can increase by at least 3%.

The thickness or the overall thickness of the hybrid core is preferably constant in the transition region, wherein the volume fractions of the foam sheet and of the fibre-reinforced plastic decrease or increase in opposite directions. It is also possible that the thickness of the foam sheet continuously decreases, and the thickness of the fibre reinforced plastic in the transition region gradually increases. The opposite design, i.e. a gradual decrease in the foam sheet thickness and a continuous increase in the fibre-reinforced plastic thickness to the edge, is also conceivable.

Due to the formation of a transitional region with a variable thickness of the foam sheet and variable thickness of the fibre-reinforced plastic, no fracture edges occur when the surface unit according to the invention is connected to the aircraft structure. Preferably, the mounting device is connected to the aircraft structure in the region of the edge regions and/or in mounting regions or mounting sections configured according to the edge regions, and/or in support regions and/or support sections designed according to the edge regions.

The/a transition region and the edge region comprise edge fibre layers, in particular at least two or four edge fibre layers, which cover the first core layer in the transition region and/or in the edge region in sections.

The fibre-reinforced plastic of the/a transition region can consist of several fibre layers and/or several sheets, which are preferably arranged one above the other such that the thickness of the fibre-reinforced plastic increases continuously and/or in a stepwise manner in the direction of the (foam-free) edge region.

The fibre-reinforced plastic of the transition region can, for example, be formed from the first and/or second core layer of the hybrid core. Furthermore, it is conceivable for the fibre-reinforced plastic of the transition region to be formed from at least one, preferably several, additionally arranged or embedded core layers and/or fibre layers.

It is possible that the fibre-reinforced plastic is formed by the second core layer of fibre-reinforced plastic. In this case, it is conceivable for the second core layer to be guided downwards and turned around in the direction of the first core layer around the synthetic resin-permeated foam sheet. By means of winding and/or folding of the end section of the second core layer and/or fibre layers of the second core layer below the foam sheet, i.e. between the foam sheet and the first core layer, such a fibre-reinforced plastic layer or such a fibre-reinforced plastic can be formed, whose thickness increases continuously and/or in a stepwise manner towards the (foam-free) edge region.

Furthermore, it is possible according to the invention that a plurality of fibre layers, which are preferably arranged or embedded above the foam sheet, are guided downwards, i.e. in the direction of the first core layers, and are turned around the foam sheet. In other words, the end sections of several fibre layers arranged or embedded above the foam sheet are arranged between the foam sheet and the first core layer. The turned or folded-over fibre layers have different lengths in this respect so that the additional fibre layers are arranged one above the other in such a way that the thickness of the fibre-reinforced plastic of the transition region increases continuously and/or in a stepwise manner to the (foam-free) edge region. Accordingly, the lengths of the additional fibre layers increase according to the folded arrangement in the direction of the support layer, which defines the underside of the surface unit.

The edge fibre layers, which preferably concern glass fibre-reinforced plastics, can be embedded at least in sections between the first core layer and the foam sheet in the transition region. Preferably, they are made from fibre strips. The strip widths of the edge fibre layers preferably decrease towards the upper side of the surface unit.

For example, the edge fibre layers can be arranged to form edge strips or a frame comprising the surface unit.

The edge strips extend in the installed state of the mounting device preferably along the longitudinal direction (X-axis) of the aircraft. A surface unit can in each case mutually have an edge strip for fastening the surface unit to the aircraft structure.

In one exemplary embodiment, the hybrid core has at least one first edge fibre layer of fibre-reinforced plastic, in particular carbon fibre-reinforced plastic, which is embedded between the first core layer and the foam sheet and covers in a strip-like manner at least sectionally the edge sections of the first core layer. Accordingly, the first edge fibre layer is formed from several, in particular four, fibre strips, which form the edge strips, and which are arranged only on the edge sections of the first core layer.

Furthermore, the hybrid core can comprise at least one second edge fibre layer of fibre-reinforced plastic, in particular carbon fibre-reinforced plastic, which is embedded between the first edge fibre layer and the foam sheet and covers the outer edge sections of the first edge fibre layer at least sectionally in strips, wherein the strip width of the second edge fibre layer is smaller than the strip width of the first edge fibre layer. In other words, the fibre strips of the first edge fibre layer are sectionally covered by fibre strips of the second edge fibre layer. Since the strip width of the second edge fibre layer is smaller than the strip width of the first edge fibre layer, the fibre strips of the first edge fibre layer are only partially covered.

Furthermore, the hybrid core may comprise at least one third edge fibre layer of fibre-reinforced plastic, in particular carbon fibre-reinforced plastic, wherein the third edge fibre layer is embedded between the second edge fibre layer and the foam sheet and covers the outer edge sections of the second edge fibre layer at least sectionally in strips, wherein the strip width of the third edge fibre layer is smaller than the strip width of the second edge fibre layer. In other words, the fibre strips of the second edge fibre layer are covered by fibre strips of the third edge fibre layer in sections. Since the strip width of the third edge fibre layer is smaller than the strip width of the second edge fibre layer, the fibre strips of the third edge fibre layer only partially cover the fibre strips of the second edge fibre layer.

Furthermore, the hybrid core can comprise at least a fourth edge fibre layer of fibre-reinforced plastic, in particular carbon fibre-reinforced plastic, wherein the fourth edge fibre layer is embedded between the third edge fibre layer and the foam sheet and covers the outer edge sections of the third edge fibre layer at least sectionally in strips, wherein the strip width of the fourth edge fibre layer is smaller than the strip width of the third edge fibre layer. In other words, the fibre strips of the third edge fibre layer are at least sectionally covered by the fibre strips of the fourth edge fibre layer. Since the strip width of the fourth edge fibre layer is smaller than the strip width of the third edge fibre layer, the fibre strips of the third edge fibre layer are only partially covered by the fibre strips of the fourth edge fibre layer.

The number of layers of the surface unit does not necessarily have to increase in (each) edge region or in (each) mounting region or in (each) support region. According to the invention, it is possible to provide only a few layers more, so that a height profile with differing heights results when connecting due to the missing foam core or the missing foam layer. For example, the surface unit can have a thickness in regions in which no foam is inserted which is at least 30%, in particular at least 50%, lower than the thickness in the region with the foam.

The edge fibre layers may concern multi-axial fabrics and/or scrims. Preferably, they are biaxial fabrics or scrims.

The hybrid core may further comprise at least one fifth, in particular at least one sixth, in particular at least one seventh, etc., edge fibre layer.

On the side of the foam facing away from the support layer, at least two fibre layers, preferably three fibre layers, can be arranged from plastic, in particular carbon fibre-reinforced plastic, which have different fibre orientations. In other words, the second core layer comprises at least two fibre layers, preferably three fibre layers, which have different fibre orientations, wherein a first fibre orientation of a fibre layer differs preferably by least 20 degrees or at least 30 degrees or at least 40 degrees or at least 45 degrees and maximally 90 degrees from a second fibre orientation of a further fibre layer. The angle values can be absolute angles. The absolute angle can be defined such that this is the smallest absolute angle value between two fibre orientations.

If three fibre layers are provided or used, two of the fibre layers, which are not arranged directly above one another, are preferably designed in such a way that they have corresponding fibre orientations. A further fibre layer arranged between the two fibre layers with the same fibre orientation, however, has a second fibre orientation which differs by at least 20 degrees or at least 30 degrees or at least 40 degrees or at least 45 degrees and at most 90 degrees from the first fibre orientation of the two fibre layers.

At least one fibre layer and/or core layer of the surface unit can comprise a fibre network of carbon fibres and/or glass fibres and/or aramid fibres. The fibres within a fibre network can extend essentially at right angles to one another, so that a grid is produced. Accordingly, at least one fibre layer can be a biaxial scrim or fabric. Any other multi-axial fabric or scrim can also be used. A corresponding fibre layer and/or core layer is particularly durable. The fibre layers with fibre networks can also be arranged in such a way that the fibre orientations of two fibre layers differ by 20 or 30 or 40 or 45 and by a maximum of 90 degrees. These angular values can also be understood as absolute angles.

Preferably, the individual layers of the hybrid core as well as the foam sheet are connected to one another by material bonding. Usually, a connection of the layers as well as of the foam sheet is produced by synthetic resin. Preferably, the foam sheet already has the aforementioned support or bridge structure, which extends substantially perpendicularly to the fibre orientation or fibre orientations of the first and second core layer.

According to the present invention, the surface unit is designed in such a way that the weight of the mounting device is reduced in such a way that the surface unit is produced from several layers, in particular in a sandwich construction. Preferably plastic materials are used for the layers. In this case, the given requirements, e.g. good friction and wearing conditions, are considered, wherein an overall very stable compound or composite material is provided.

In one embodiment, the surface unit is provided with a cover layer. The cover layer is a wearing layer, which forms the upper side of the surface unit.

The cover layer can be formed in one or more layers. The cover layer can be made, for example, from a metal alloy, e.g. from an aluminium alloy. Preferably, it is formed from a glass fibre-reinforced plastic and/or a material from the group of aromatic polyamides (e.g. aramid). The cover layer can protect the hybrid core or the uppermost core layer of the hybrid core from wear and tear, and stiffen the sandwich or composite construction in total.

Accordingly, the surface unit can have at least a first fibre layer or topcoat layer which is arranged on the side of the support layer facing away from the second core layer, wherein the first topcoat layer, which is made of fibre-reinforced plastic, in particular glass fibre-reinforced plastic, has a first fibre orientation. The first topcoat layer can therefore be a first fibre layer made of glass fibre and/or aramid. The first topcoat layer or cover layer is preferably connected to the second core layer by material bonding.

The cover layer can further comprise at least one second fibre layer or a second topcoat layer, which is arranged on the first topcoat layer, wherein the second topcoat layer is made of fibre-reinforced plastic, especially glass fibre-reinforced plastic, and has a second fibre orientation, wherein the first fibre orientation of the first topcoat layer preferably differs by at least 20 degrees, or at least 30 degrees, or at least 40 degrees, or at least 45 degrees, and a maximum of 90 degrees from the second fibre orientation.

The total thickness of the cover layer, i.e. the total thickness of all topcoat layers, can be 0.1 to 1.0 mm, in particular 0.2 to 0.8 mm, in particular 0.4 to 0.7 mm, in particular 0.6 mm. Preferably, the cover layer or the topcoat layers have only a small thickness in relation to the total thickness of the surface unit, e.g. less than 15%, in particular less than 10%, in particular less than 8%, of the total thickness.

The synthetic resin-permeated foam sheet can have a thickness of 2.00 mm to 12.00 mm, in particular of 3.00 mm to 10.0 mm. The specifications of the foam sheet thicknesses refer to the foam sheet in the uncompressed region of the hybrid core, i.e. the specifications of the foam sheet thicknesses in particular do not concern the lateral (foam-free)

edge region as well as the transition region of the hybrid core. Preferably, the foam sheet has a large thickness or a large proportion of the total thickness in relation to the thickness of the entire surface unit, e.g. more than 20%, in particular more than 30%, in particular more than 40%, in particular more than 45%, of the total thickness. In this respect, significantly lighter surface units can be produced since the weight of the foam sheet is relatively low compared to the other core layers or compared to the support layer.

In one embodiment, the mounting device comprises several sections, e.g. at least one side part and one base plate. In the installed state, the side part is inclined relative to the base plate, so that the latter can be made thinner, for example, by at least 20 or 30 percent because of the lower loads. The foam core can be dimensioned correspondingly thinner. The foam sheet of the base plate can have a thickness of 6.00 mm to 12.00 mm, in particular of 8.00 mm to 10.00 mm. The foam sheet of the side part can have a thickness of 2.00 mm to 6.00 mm, in particular of 3.00 mm to 5.00 mm.

In one embodiment of the invention, it is conceivable for the foam sheet to consist of a plurality of foam layers or to comprise a plurality of foam layers. The individual foam layers can have different thicknesses compared to one another.

Preferably, the individual foam layers, which have different thicknesses, are arranged in such a way with respect to each other that the thicknesses increase towards the centre of the foam sheet. In other words, the thicknesses of the layers of foam decrease, starting from the foam sheet centre to the outside. Preferably, the foam layers are arranged symmetrically to each other. In respect of the layer arranged centrally in the foam sheet, foam layers with a first thickness can be arranged or positioned on both sides, wherein the second thickness of outer foam layers is less than the first thickness.

The foam layers of the foam sheet can be connected to one another by material bonding. In particular, the foam layers are connected to one another by the application and the curing of a synthetic resin. The proportion of the resin filling in the foam sheet can be 20%-60%, in particular 30%-50%, in particular 40%. With the aid of a foam sheet thus formed, a support structure is provided, which has a particularly high compressive strength. As the resin content increases, the compressive strength increases.

In a further embodiment of the invention, layers of fibre-reinforced plastic, in particular of carbon fibre-reinforced plastic, are embedded between individual, preferably between several, foam layers. With the aid of a foam sheet thus formed, a support structure is provided, which has a particularly high compressive strength. In the formation of such a foam sheet, the bonding of the individual foam layers and the layers of fibre-reinforced plastic can also be effected by material bonding. Preferably, the foam layers and layers of fibre-reinforced plastic interposed therebetween are connected to one another by application and curing of a synthetic resin. The proportion of the resin filling in the foam sheet can be 2%-6%, in particular 3%-5%, in particular 4%. The foam sheet is accordingly relatively light but can withstand very high pressure loads. By introducing additional layers of fibre-reinforced plastic, point loads acting on a surface unit can be more evenly distributed in the foam sheet.

The edge region of a surface unit, which comprises a foam sheet with several foam layers, can be compressed and/or crimped.

Furthermore, it is conceivable that at least one foam layer or several foam layers or all foam layers of the foam sheet do not extend into the edge region or the edge regions of the surface unit. That is, the formation of a foam-free edge region or of an edge region with a decreasing foam sheet thickness is also conceivable.

The surface unit can have a thickness or a total thickness of 5.0 mm to 20.00 mm, in particular of 7.0 mm to 15.0 mm, in particular of 8.0 mm to 12.0 mm, in particular of 7.6 mm. However, the thickness of the surface unit can also vary according to the invention as described above. Here, a maximum thickness of 5.0 mm to 20.00 mm, in particular of 7.0 mm to 15.0 mm, in particular of 8.0 mm to 12.0 mm, in particular of 7.6 mm, can be obtained.

In addition to the described foam-free edge regions and/or the edge regions in which the foam layers are highly compressed or very thin, the surface unit can also have support areas which have a similar or identical structural design, as previously described with reference to the edge regions. The support areas are preferably arranged such that they can be connected to the structure of the aircraft.

Corresponding support areas can also be provided at the points of the surface unit on which the functional device and/or the reinforcing devices can be mounted.

The support areas can be penetrated in sections for accommodating screw devices, e.g. in the form of holes.

In one embodiment, these support areas are formed in the cross-section from fibre layers and resin, wherein no foam core is provided. Depending on the application, the number of layers in the support area can be increased as described above in order to improve the stability.

The surface units described above are designed, in particular, for mounting in the floor area. Furthermore, however, it is also possible to form the surface unit for mounting in the side and ceiling area, so that larger sections of surface units for covering ceilings and walls in the freight compartment can be introduced therein and installed in a simpler manner than before. For this purpose, it is advantageous if the surface units have defined kink sections in which rigidly designed planar sections can be mounted at an angle to each other in the aircraft. This also applies, of course, to the floor sections, which usually have angled sections in their lateral areas due to the curvature of the barrel-shaped aircraft fuselage.

The described support areas can form the planar sections and/or be provided along kink sections. The kink sections can be configured flexibly by means of an elastomer. In one embodiment, the described surface unit comprises at least one elastomer strip for forming a kink section. The elastomer strip can be laminated in when the surface unit is constructed as a fibre composite material. It is possible to provide an elastomer strip for forming the kink section instead of the described foam core. Fibre layers can thus be provided above and below the elastomeric strip. According to the invention, it is possible to interrupt some or all of the fibre layers above and/or below the elastomer strip. Preferably, less resin or no resin is introduced into the regions of the elastomeric strip. For the production of the kink section, a non-vulcanised or only partially vulcanised (synthetic) rubber can be inserted between the fibre layers, which rubber is vulcanised during the curing process of the provided resin.

The described sealing lip can also be produced accordingly. For this purpose, a (synthetic) rubber is inserted at the edge of the surface unit, preferably towering over the fibre layers, and vulcanised on curing. The sealing lip can also be formed upwards or downwards by applying the rubber, preferably in strip form, to the fibre layers at the top or at the bottom.

BRIEF DESCRIPTION OF THE DRAWINGS

Embodiments of the invention are explained in more detail below with reference to the drawings, wherein:

FIG. 1 shows a partial perspective view of an aircraft cargo hold with surface units on the floor and the ceiling, FIG. 2 shows a sectional view of the region II from FIG. 1, FIG. 3 shows a schematic representation of a "rivet nut", FIG. 4 shows a highly schematic cross-section through an aircraft fuselage with cargo hold, FIG. 5 shows an enlarged view of the region V of FIG. 4, FIG. 6 shows an exploded view of the arrangement according to FIG. 5, FIG. 7 shows an illustration similar to that of FIG. 6, but for explaining a further embodiment of the invention.

DETAILED DESCRIPTION OF THE INVENTION

Figure 8:
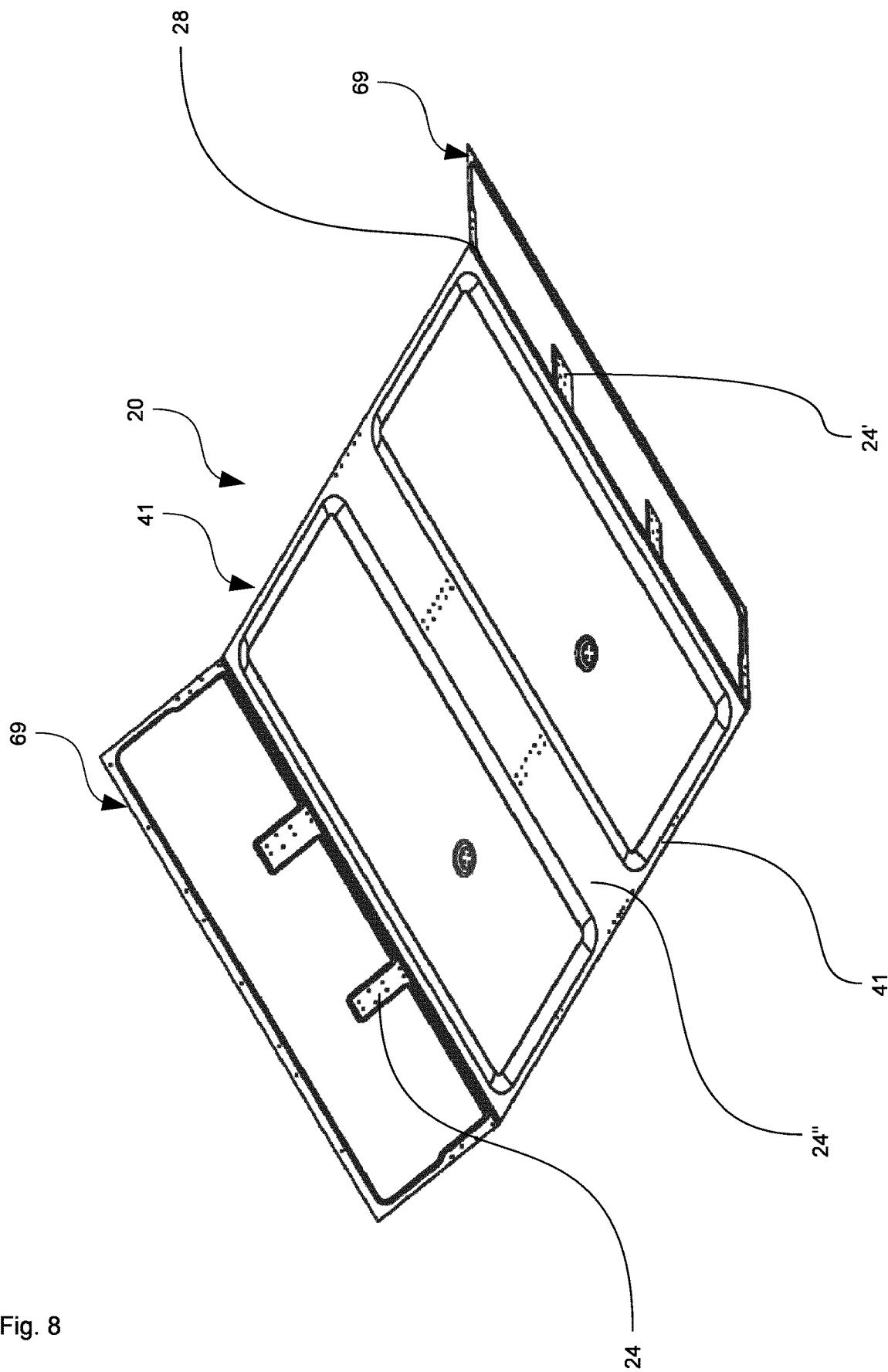
FIG. 8 shows a wide surface unit for mounting in an aircraft cargo hold.

In the following description, the same reference numerals are used for identical and identically acting parts.

In an aircraft fuselage, an outer skin 1 is fastened in a defined manner by frames 2, wherein transverse beams 3 are fastened to the frames 2 as well as longitudinal beams 4.

The actual bottom of the cargo hold rests on the transverse beams 3.

A roller track 30" is provided in the centre and roller tracks 30' at the side. Surface units 20 form a bottom of the cargo hold 10 and surface units 20' are attached to upper transverse beams 3' (see FIG. 3) to form walls and ceilings of cargo hold 10. In this case, planar sections are connected to each other by means of bending sections 28, 28' in such a way that the surface units 20 can be uniformly handled for forming the cargo hold floor as well as the surface units 20' for forming the side walls and ceilings of the cargo hold, which considerably facilitates their mounting especially under the tight conditions in the interior of the aircraft.

The assembly of a surface unit 20 including functional devices 30, 30' attached thereto is explained in more detail below with reference to FIGS. 2-6.

Firstly, functional devices 30, 30', 30" (in FIG. 2 a roller element 30', a lashing eye 30 in FIGS. 5/6) are fastened to a surface unit 20 by means of a fixing screw 21 on corresponding mounting devices outside the aircraft. When a surface unit 20 is provided with all the functional devices 30, 30', 30" provided in its region, it is moved to the cargo hold 10 and positioned there in such a way that the fastening bores of the functional devices 30, 30', 30", which are aligned with the corresponding through-bores in the surface unit 20, lie above the threaded bores in the transverse support 3 or in the frame 2. This, of course, requires prior planning and accurate alignment of the bores and mounting points to be made, but this is "normal craftsmanship" in aircraft construction. Instead of threaded bores, rivet nuts 32 are preferably used, which can be fixed in a rotationally fixed manner by means of compressed air tools in the frame 2 or in the transverse beam 3, as shown in the sections a-c of FIG. 3.

As soon as the surface units 20 with the functional devices 30, 30' mounted thereon are properly aligned in the aircraft cargo hold 10 relative to the transverse beams 3, the frames 2, etc., they can be firmly connected to the supporting structures of the aircraft by means of fastening screws 31. Reference is made to FIGS. 2 and 5, which show the basic construction.

The same applies to the surface units 20' for forming side walls and ceiling surfaces of the cargo hold 10, which are fastened to upper transverse beams 3'. Here, of course, other functional devices 30''' are provided, e.g. lighting devices or again lashing devices as well.

Therefore, the fact is important for understanding the illustrated mounting device that initially a functional device 30, 30', 30", 30''' is mounted on an upper side 22 of the surface unit 20 in such a way that the fixing device, in this case a fixing screw 21, is accessible from a underside 23 of the surface unit 20. Only then is the surface unit 20 together with the functional device 30, 30', 30", 30''' mounted on the supporting structure, which in this case is a transverse beam 3 or a frame 2, of the aircraft. This ensures that the surface unit 20 does not have to absorb the load which acts on the functional device 30. On the other hand, however, the functional device 30 holds the surface unit 20 on the transverse beam 3 or a corresponding fastening structure.

The surface unit 20 is preferably constructed as a composite body in sandwich construction, as is indicated in FIG. 7. For this purpose, cover surfaces 25, 25', which are made of fibre-reinforced plastic for example, are joined together via a foam core 26, resulting in a very light yet stable structure.

At those locations at which functional devices 30 are to be mounted, the structure of the surface unit 20 or its internal structure is modified in a way that reinforcing material 27 is used for example. It is then no longer possible for the foam core 26, which is too fragile in the case of such loads, to be compressed or otherwise deformed. It is, of course, also possible to change the regions of the surface unit 20 in their shape, e.g. with respect to their thickness, in those areas in which functional devices 30 are provided.

Furthermore, it is advantageous if threads are not directly cut into the load-bearing structures, in the example here the transverse beams 3 are shown, but instead rivet nuts 32 are used and are connected to the material of the load-bearing structure in such a way that the fastening screws 31 find sufficient support. This allows considerably higher loads to be absorbed.

Figure 9:
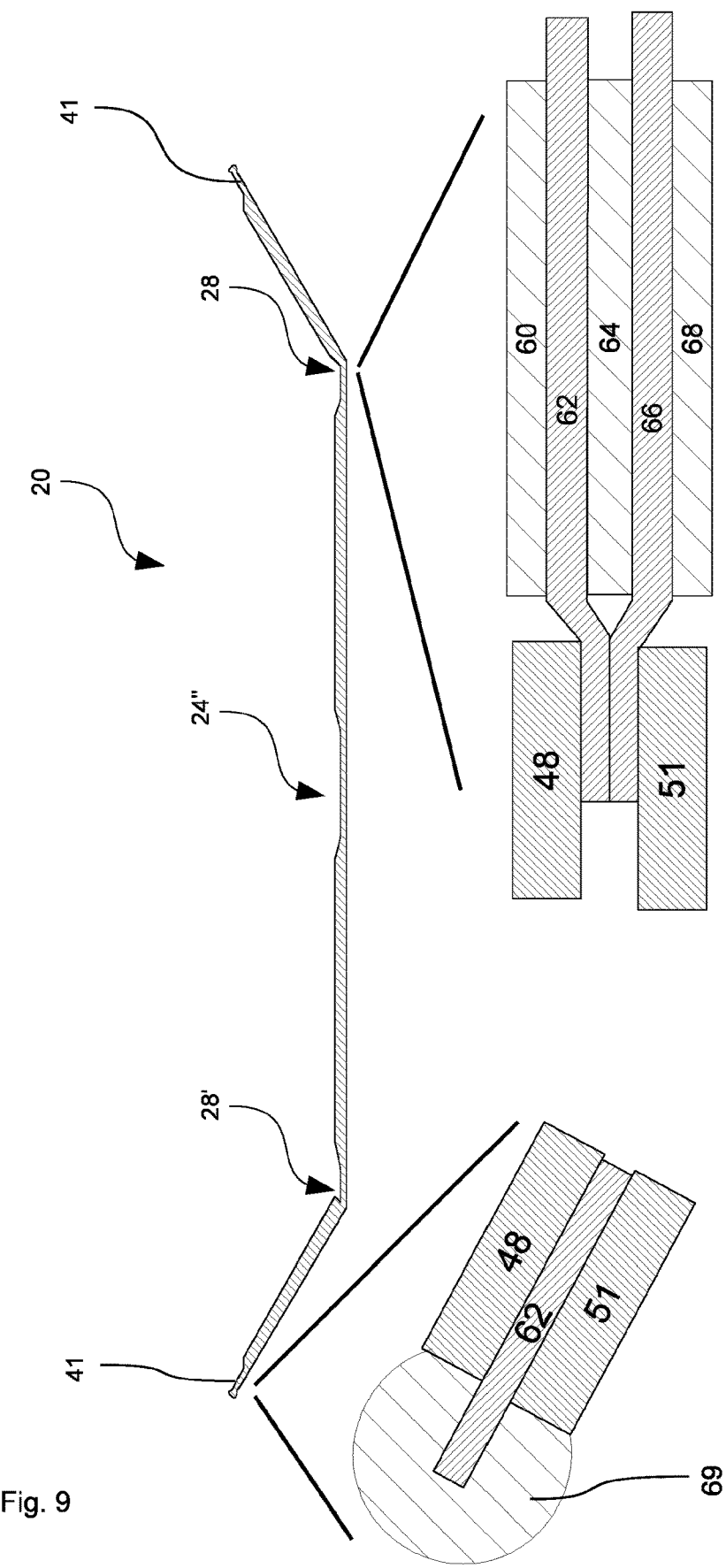
FIG. 9 shows a schematic cross-section through the surface unit from FIG. 8.

FIG. 8 shows another mounting device according to the invention in the uninstalled state or before installation and without functional devices 30, 30', 30", 30'''. As shown in FIG. 9, which is a highly schematic cross-section through the surface unit 20 of the mounting device shown in FIG. 8, the surface unit 20 is composed of a horizontal base plate and two side parts which are angled in relation to the base plate. The side parts are respectively connected to the base plate via the kink sections 28, 28'. The entire surface unit 20 has a circumferential edge region 41, which in the embodiment shown is approximately 5 cm wide. The base plate has a central mounting section 24 which extends over the entire longitudinal direction of the surface unit 20 and has a width of approximately 30 cm. The mounting section 24" is designed such that it is suitable for fastening the surface unit 20 to the aircraft structure. A few holes are provided for this purpose. At the same time, as already explained with reference to FIG. 1, functional devices 30" can be installed in this mounting section 24". The functional devices 30" preferably concern a roller track, as also shown in FIG. 1.

The freight unit 20 also has four mounting sections 24, 24' on the side parts of the surface unit 20. These mounting sections 24, 24' are approximately 10-15 cm wide and approximately 30 cm long. Functional devices, for example the functional devices 30' of FIG. 1, can also be installed in the mounting sections 24, 24'.

On the outer edges of the side parts there are in each case rubber lips 69, which make it possible to produce a gas-tight and/or water-tight connection to further channels, e.g. the surface unit 20' of FIG. 1.

Figure 10:
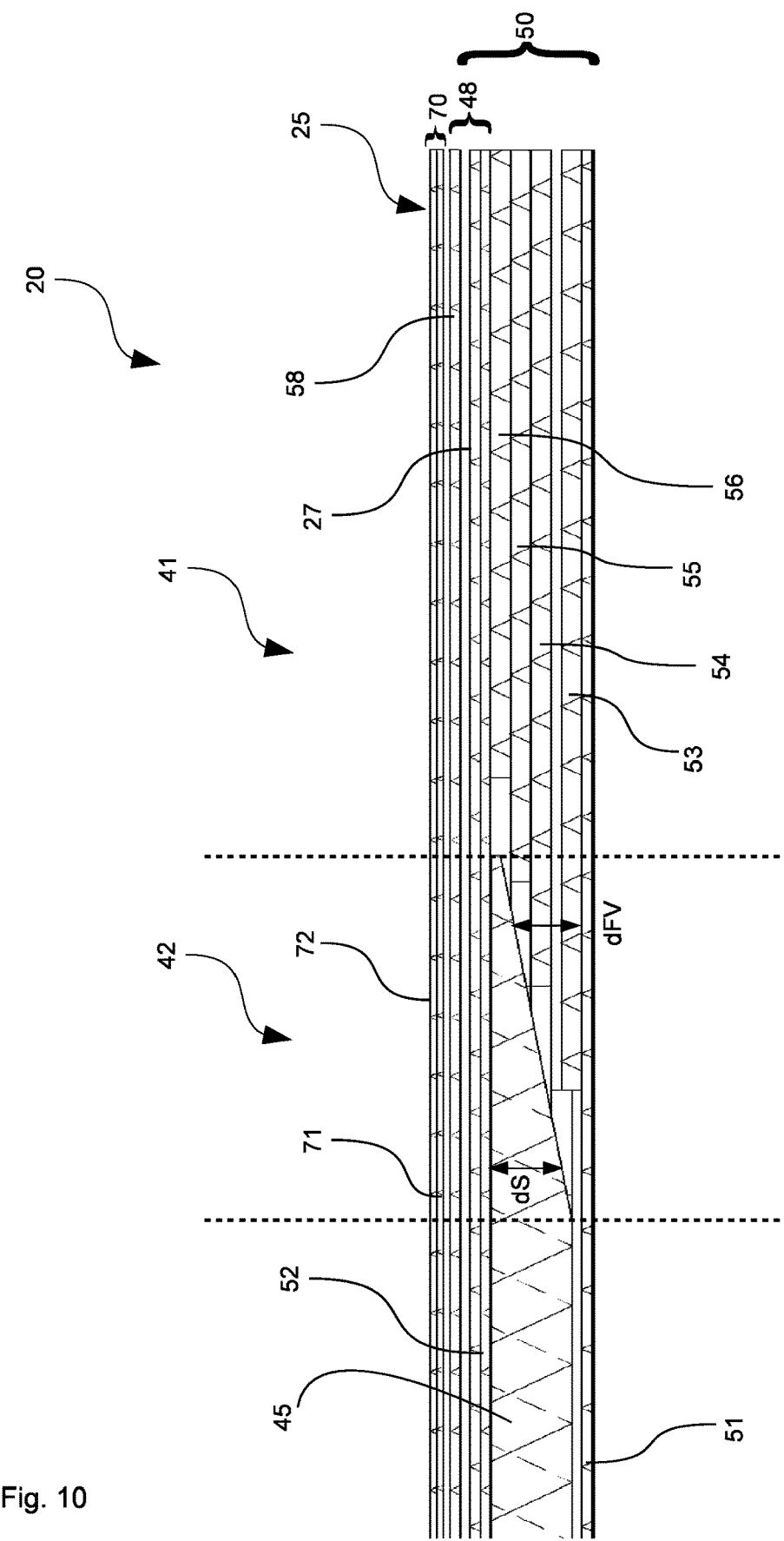
FIG. 10 shows a schematic layer structure of the edge region of a surface unit.

FIG. 10 shows a schematic view of a further embodiment of the edge of a surface unit 20 according to the invention for a cargo hold 10.

The surface unit 20 comprises a hybrid core 50 which has a synthetic resin-penetrated foam sheet 45 (=foam 15), which is embedded between a first core layer 51 of carbon fibre-reinforced plastic and a second core layer 48 of carbon fibre-reinforced plastic.

The hybrid core 50, as shown according to the brace, thus has several layers with a plurality of fibre layers.

It can be seen in the cross-section that the hybrid core 50 comprises a lateral, foam-free edge region 41. The edge region 41 preferably has carbon fibre-reinforced plastic, wherein the foam sheet 45 does not extend into the edge region 41. Furthermore, a transition region 42, which adjoins the edge region 41, is shown. The hybrid core 50 preferably has a rectangular basic shape so that the edge region 41 is preferably formed on several sides, preferably on all four sides. Accordingly, a fully encompassing edge region 41 can be formed from fibre-reinforced plastic, in particular carbon fibre-reinforced plastic, which forms an outer frame.

A transition region 42 preferably adjoins this outer frame, namely the foam-free edge region 41. It is preferably also formed to rest on all edge regions 41 of a hybrid core 50, i.e. the transition region 42 also forms a frame shape, which is formed within the frame of the outer edge region 41. The transition region 42 comprises both the foam sheet 45 as well as fibre-reinforced plastic 46, in particular carbon fibre-reinforced plastic. The thickness dS of the foam sheet 45 decreases continuously in the transition region 42 to the foam-free edge region 41. Accordingly, the foam sheet 45 in the transition region 42 forms a triangular shape or a ramp shape, so that the thickness dS of the foam sheet 45 decreases steadily. The thickness dFV or the number of layers of fibre layers 53, 54, 55 of the fibre-reinforced plastic 46 gradually increases in the transition region 42 to the lateral, foam-free edge region 41.

The fibre-reinforced plastic 46 of the transition region 42 consists, according to the exemplary embodiment in FIG. 10, of several fibre layers, namely the first, second and third edge fibre layer (43, 44, 45). Due to the different lengths of the three edge fibre layers (43, 44, 45), the overall thickness dFV of the fibre-reinforced plastic 46 increases step by step in the transition region 42.

The lateral foam-free edge region 41 is formed in the illustrated example from eight layers, which consist of fibre-reinforced plastic, namely carbon fibre-reinforced plastic. This concerns the first core layer 51 as well as the three fibre layers 52, 57, 58 of the second core layer 48. In addition, four edge fibre layers, namely the first (53), the second (54), the third (55) and the fourth, (56) edge fibre layer, are formed in the edge region 41.

A cover layer 70, which comprises a first topcoat layer 71 and a second topcoat layer 72, is provided on the hybrid core 50. The first topcoat layer 71 is arranged on the side of the uppermost fibre layer 48 facing away from the support layer 30, wherein the first cover layer 71 made of glass fibre-reinforced plastic has a first fibre orientation VF1 and is connected to the uppermost fibre layer 48 or the second core layer 48 by materially bonded connection.

The second topcoat layer 72 is arranged on the first topcoat layer 71 and also consists of glass fibre-reinforced plastic and has a second fibre orientation VF2, wherein the first fibre orientation VF1 differs by, for example, 45 degrees from the second fibre orientation VF2.

In the context of the illustration in FIG. 10, it is pointed out that this is merely a schematic exploded view of a partial section of a surface unit 20 according to the invention. In other words, the illustrated clearance spaces, such as, for example, between the cover layer 40 and the fibre layer 28 or between the fibre layers 47 and 48, are actually not formed in a completely produced surface unit 20.

Figure 11:
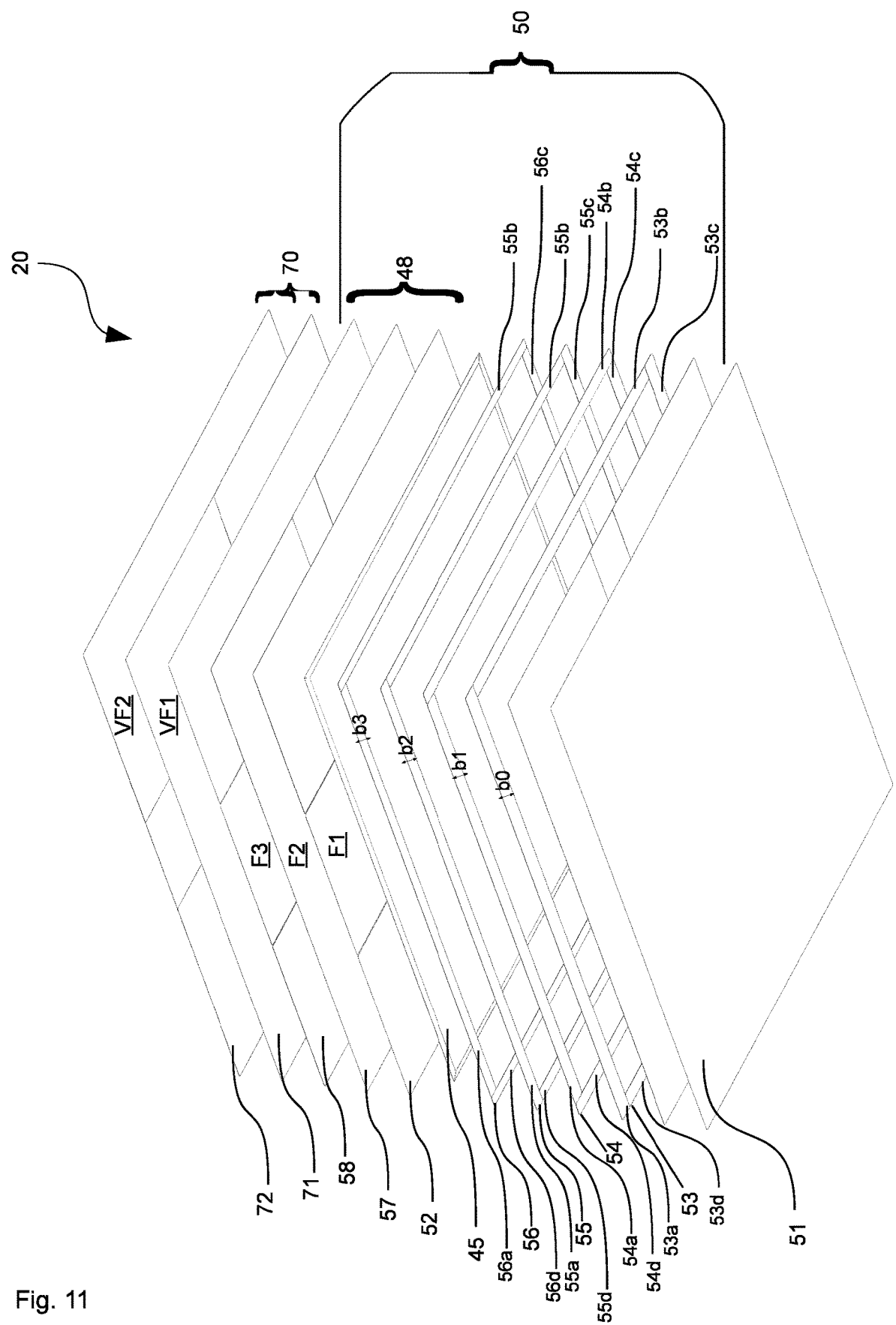
FIG. 11 shows a schematic layer structure of a section of a surface unit comprising a hybrid core.

FIG. 11 shows an example of how a foam core can be surrounded with a pure fibre frame. With the corresponding technique, more complex structures can be produced, as these are necessary, for example, for producing the surface unit 20 from FIG. 8. The individual core layers and the fibre layers are schematically shown in the non-connected state. The hybrid core 50 in this example is multi-layered and comprises the resin-penetrated foam sheet 45 interposed between a first core layer 51 of carbon-fibre-reinforced plastic and a second core layer 48 of carbon-fibre-reinforced plastic.

The hybrid core 50 comprises a first edge fibre layer 53 of carbon fibre-reinforced plastic, wherein the first edge fibre layer 53 is embedded between the first core layer 51 and the foam sheet 45 and covers at least sectionally the edge sections of the first core layer 51 in strip form. The first edge fibre layer 53, which is formed in a strip-like manner, forms with the four fibre strips 53a, 53b, 53c and 53d a frame which thus covers the edge sections of the first core layer 51.

The hybrid core 50 further comprises a second edge fibre layer 54 of carbon fibre-reinforced plastic, wherein the second edge fibre layer 54 is embedded between the first edge fibre layer 53 and the foam material 45 and at least sectionally covers the outer edge sections of the first edge fibre layer 53 in a strip-like manner. Accordingly, the strip-like second edge fibre layer again forms a frame with the four fibre strips 54a, 54b, 54c and 54d, which frame is placed on the frame or the fibre strips of the first edge fibre layer 53 forming the frame. The strip width b1 of the second edge fibre layer 54 is smaller than the strip width b0 of the first edge fibre layer 53 so that the first edge fibre layer 53 is only covered in sections by the outer edge of the second edge fibre layer 54.

The hybrid core 50 further comprises a third edge fibre layer 55 of carbon fibre-reinforced plastic, wherein the third edge fibre layer 55 is embedded between the second edge fibre layer 54 and the foam sheet 45 and covers the outer edge regions of the second edge fibre layer 54 at least sectionally in strip form. The third edge fibre layer 55, which is formed in the manner of a strip, thus forms a frame with the four fibre strips 55a, 55b, 55c and 55d, which is placed on the strips or the frame of the second edge fibre layer 54. The strip width b2 of the third edge fibre layer 55 is smaller than the strip width b1 of the second edge fibre layer 54, so that the second edge fibre layer 24, originating from the outer edge of the second edge fibre layer 54, is only covered in sections, thus not completely, by the third edge fibre layer 55.

In addition, the hybrid core 50 has a fourth edge fibre layer 26 of carbon fibre-reinforced plastic, wherein the fourth edge fibre layer 56 is embedded between the third edge fibre layer 55 and the foam sheet 45 and covers at least sectionally the outer edge sections of the third edge fibre layer 55. The strip-shaped fourth edge fibre layer 56 thus forms a frame with the four fibre strips 56a, 56b, 56c and 56d, which is placed on the strips or the frame of the third edge fibre layer 55. The strip width b3 of the fourth edge fibre layer 56 is smaller than the strip width b2 of the third edge fibre layer 55. The third edge fibre layer 55 or the fibre strips of the third edge fibre layer 55 forming the frame are only partly covered by the outer edge of the third edge fibre layer 55. The strip width b3 of the fourth edge fibre layer 56 preferably has a value of 30 mm.

The three fibre layers 52, 57, 58 form the second core layer. The three fibre layers 52, 57, 58 have different fibre orientations, wherein the fibre orientation F1 of the fibre layer 52 preferably differs by at least 45 degrees from the second fibre orientation F2 of the further fibre layer 57. The further fibre layer 58 has a fibre orientation F3, wherein the fibre orientation F3 coincides with the fibre orientation F1 of the fibre layer 52 and thus differs from the fibre orientation F2 of the fibre layer 57 by at least 45 degrees.

The foam sheet 45 has honeycomb-shaped recesses which allow the cured synthetic resin of the synthetic resin-permeated foam sheet 45 to produce a direct material connection between the foam sheet 45 and the first 51 and second core layers 48, in particular the fibre layers 51-58. In this respect, the foam sheet 45 covered by the CFK layers 51-58 is particularly well suited for absorbing vertical loads without producing a compression of the cured hybrid core 20. The cured synthetic resin in the recesses of the foam sheet 45 thus forms a support structure.

The first topcoat layer 71 is made of glass fibre reinforced plastic and has a first fibre orientation VF1. Preferably, the fibre layer 58 is connected to the first topcoat layer 71. A second topcoat layer 72 is arranged on the first topcoat layer 71, wherein the second topcoat layer 72 is made of glass fibre-reinforced plastic with a second fibre orientation VF2. The first fibre orientation VF1 differs, for example, by 45 degrees from the second fibre orientation VF2.

The first CFK or core layer 51 and the three fibre layers 52, 57 and 58 can each have, for example, a thickness of 0.2 to 1.0 mm, in particular 0.44 mm. The first GRP or topcoat layer 71 and the second GRP or topcoat layer 72 can each have a thickness of 0.1 mm to 0.6 mm, in particular 0.3 mm.

The synthetic resin-penetrated foam sheet 45 may have a thickness of 8 mm to 9 mm. The described thickness of the foam sheet 45 concerns only the middle region of the hybrid core 50 and not the thickness dS in the transition region 42.

The surface unit 20 has a thickness or total thickness of 9.0 to 11.0 mm, in particular of 10 mm.

With reference to FIGS. 10 and 11, it has been explained how an edge region for a foam-reinforced hybrid core 50 can be formed in an effective manner. This basic technique is applied according to the invention in order to form the entire surface unit 20, as is shown, for example, in FIG. 8. The peripheral edge region 41 shown there and described above is free of foam and is reinforced by corresponding fibre layers. For the person skilled in the art who works in this field, it should be readily apparent that the structure of the edge region described in FIG. 10, which still has cavities, leads to a lower layer thickness during compression than the region comprising the foam sheet 45. Thus, the edge regions 41 and mounting sections 24, 24', 24" shown in FIG. 9 can be produced.

In addition, the technique can be used to produce the kink sections 28, 28' shown in FIG. 9. For this purpose, fibre strips 62 and 66 are inserted into the foam-free area between the first and second core layers 51, 48. As shown in FIG. 9 in the schematic cross section, a rubber strip 64 can be inserted between the fibre strips 62, 66, which creates the flexibility in the kink section 28 or 28' and connects the edge region 41 of the base plate to the edge region 41 of the side part. Further rubber strips 64 can also be provided on the outwardly facing sides of the fibre strips 62, 66, so that a substantially uniform configuration is obtained, as is the case in the edge region 41. The fibre strips 62, 66 and the core layers 48, 51 can be bonded with resin, which can fill any cavities that may be formed. Preferably, at least a partial section of the kink section 28 or of the kink section 28' is resin-free, so that here a connection of the side parts with the base plate is made, which connection is elastic. By virtue of this particular layer construction, the side parts can be flexibly pivoted against the base plate and can be installed more easily in the cargo hold 10. Furthermore, the flexible kink sections 28, 28' allow compensation of tolerances.

In a similar manner, the rubber lips 69 can be produced. For this purpose, a fibre strip 62 is again inserted between the core layers 48, 51 at the edge regions 41. The fibre strip 62 can be connected to the fibre-reinforced core layers 48, 51 via a resin. In the embodiment shown in FIG. 9, the fibre strip 62 protrudes laterally beyond the core layers 48, 51 and is provided at this point with a substantially bead-shaped rubber lip 69.

The provision of rubber strips, for example on the underside of the surface unit 20, can also be useful at further points, e.g. below the mounting section 24".

In principle, the rubber strips 60, 64, 68 and the rubber lip 69 can be ensured simultaneously with the production of the fibre composite structure of the surface unit 20. For this purpose, synthetic rubber is placed between the individual fibre layers or on the individual fibre layers. By compression and curing, vulcanisation of the synthetic rubber takes place so that the described rubber strips 60, 64, 68 and the rubber lip are produced.

In the described exemplary embodiment, the base plate and the side parts have a similar overall thickness. In a preferred exemplary embodiment, the side parts are clearly thinner than the base plate, by approximately 40%. In the exemplary embodiments described, the surface units comprise numerous carbon layers. According to the invention, some or all of these layers can be replaced by glass fibre layers, in particular made of S-glass. Glass fibre layers are particularly preferred on the upper side 22 and on the underside 23, since they are resistant to impacts. Carbon layers can be used specifically, in particular in the second core layer, in order to isolate a fire in the bilge.

BEZUGSZEICHENLISTE

1 Outer skin
2 Frames
3 Transverse beams
4 Longitudinal beams
10 Cargo hold
20, 20' Surface unit
21 Fixing screw
22 Upper side
23 Underside 24, 24', 24" Mounting section
25, 25' Cover surface
26 Foam
27 Reinforcing material
28, 28' Kink section
30, 30', 30", 30'" Functional devices
31 Fastening screw
32 Rivet nut
40 Cover layer
41 Edge region
42 Transition region
43 Corner
44 Recess
45 Foam sheet
46 Fibre-reinforced plastic
48 Second core layer
50 Hybrid core
51 First core layer
52 Fibre layer
53 First edge fibre layer
53a,b,c,d Fibre strip of the first edge fibre layer
54 Second edge fibre layer
54 a,b,c,d Fibre strip of the second edge fibre layer
55 Third edge fibre layer
55 a,b,c,d Fibre strip of the third edge fibre layer
56 Fourth edge fibre layer
56 a,b,c,d Fibre strip of the fourth edge fibre layer
57 Fibre layer
58 Fibre layer
60, 64, 68 Rubber strip
62, 66 Fibre strip
69 Rubber lip
70 Cover layer
71 First topcoat layer
72 Second topcoat layer

The invention claimed is:

1. A mounting device for a cargo hold of an aircraft, the mounting device comprising at least one surface unit, and a plurality of functional devices are mountable on the surface unit in such a way that the surface unit, together with the functional devices mounted thereon, are insertable into the cargo hold in such a way that all functional devices come to lie in the cargo hold at defined mounting positions and are mountable without adjustment relative to the surface unit on support structures of the aircraft or of the cargo hold respectively, wherein the surface unit comprises a sandwich structure comprising:
    a. a first core layer of fibre-reinforced plastic;
    b. a second core layer of fibre-reinforced plastic;
    c. at least an intermediate layer, which is embedded between the first and second core layer,
    and wherein the thickness of the intermediate layer decreases in a transition region towards an edge region.

2. The mounting device according to claim 1, wherein the functional devices are designed such that they are fastenable to the surface unit by screw devices.

3. The mounting device according to claim 2, wherein the screw device is actuatable on a side of the surface unit which is opposite the functional device.

4. The mounting device according to claim 1, wherein the surface unit is designed for the formation of a gas-tight and/or watertight barrier between its upper side and its underside.

5. The mounting device according to claim 1, wherein the surface unit comprises sealing lips which are arranged at edges of the surface unit.

6. The mounting device according to claim 1, wherein the surface unit is designed to form an accessible floor.

7. The mounting device according to claim 1, wherein the surface unit comprises a fibre-reinforced plastic material.

8. The mounting device according to claim 1, wherein reinforcing struts are embedded in the sandwich structure.

9. The mounting device according to claim 1, wherein the surface unit has reinforcing means in sections on which the functional devices are mountable.

10. The mounting device according to claim 1, wherein the surface units are designed for mounting in the base region.

11. The mounting device according claim 1, wherein the surface units are designed for mounting in the side and ceiling region.

12. The mounting device according to claim 1, wherein the surface units comprise defined kink sections in which rigidly designed planar sections are mountable at an angle to one another in the aircraft.

13. A method for mounting functional devices within a cargo hold of an aircraft, comprising the steps of:
    a) pre-mounting functional devices at predefined locations on a surface unit outside the aircraft, the surface unit being at least partly made of fibre-reinforced plastic, the functional devices comprising at least one roller track;
    b) inserting the surface unit together with the pre-mounted functional devices into the cargo hold of the aircraft in a final position in such a way that the functional devices come to lie in the cargo hold at defined mounting positions and are mountable without adjustment relative to the surface unit on support structures of the aircraft;
    c) fastening the functional devices together with the surface unit to supporting structures of the aircraft, wherein the at least one roller track is attached to a plurality of transverse beams of the aircraft.

14. A cargo hold of an aircraft comprising support structures, a mounting device, the mounting device comprising at least one surface unit, and a selection of functional devices, the selection of functional devices comprising at least one roller track, wherein the selection of functional devices are pre-mounted on the surface unit in such a way that the surface unit, together with the pre-mounted selection of functional devices are insertable into the cargo hold and attachable to the cargo hold in a final position in such a way that the selection of functional devices come to lie in the cargo hold at defined mounting positions and are mountable without adjustment relative to the surface unit on support structures of the aircraft or of the cargo hold respectively, wherein the roller track is pre-mounted to the surface unit such that the roller track extends in a longitudinal direction of the aircraft and is attachable to a plurality of transverse beams being part of the support structures, wherein the surface unit is at least partly made of fibre-reinforced plastic.

15. The cargo hold of an aircraft according to claim 14, wherein the functional devices are designed such that they are fastenable to the surface unit by screw devices.

16. The cargo hold of an aircraft according to claim 15, wherein the screw device is actuatable on a side of the surface unit which is opposite the functional device.

17. The cargo hold of an aircraft according to claim 14, wherein the surface unit is designed for the formation of a gas-tight and/or watertight barrier between its upper side and its underside.

18. The cargo hold of an aircraft according to claim 14, wherein the surface unit comprises sealing lips which are arranged at edges of the surface unit.

* * * * *